UNITED STATES PATENT OFFICE.

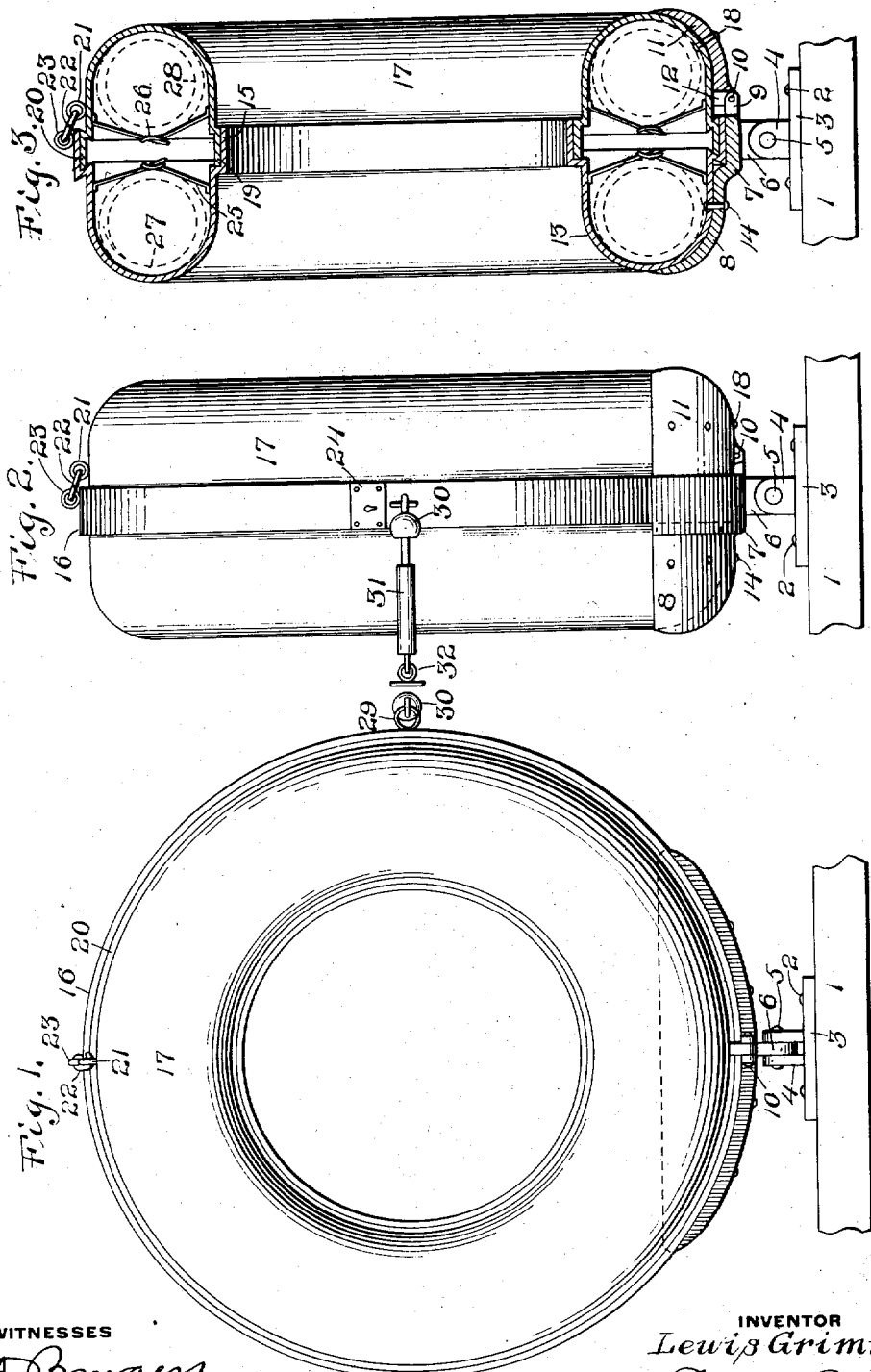

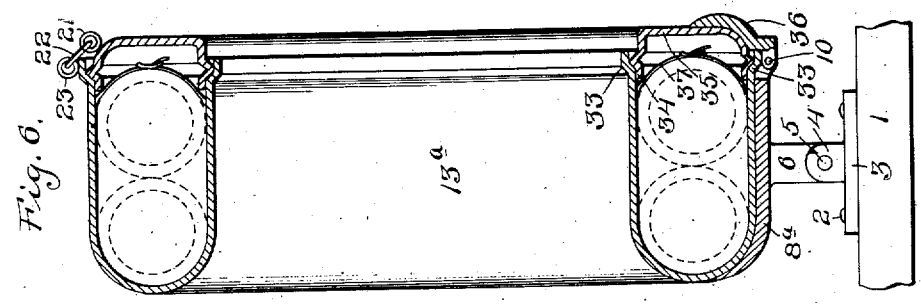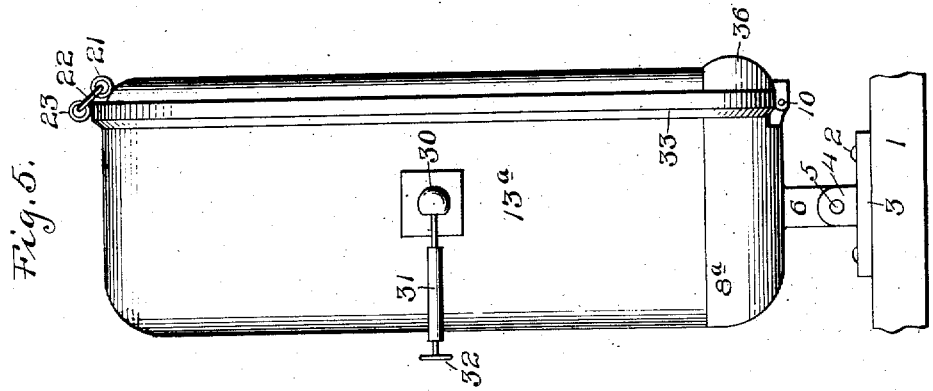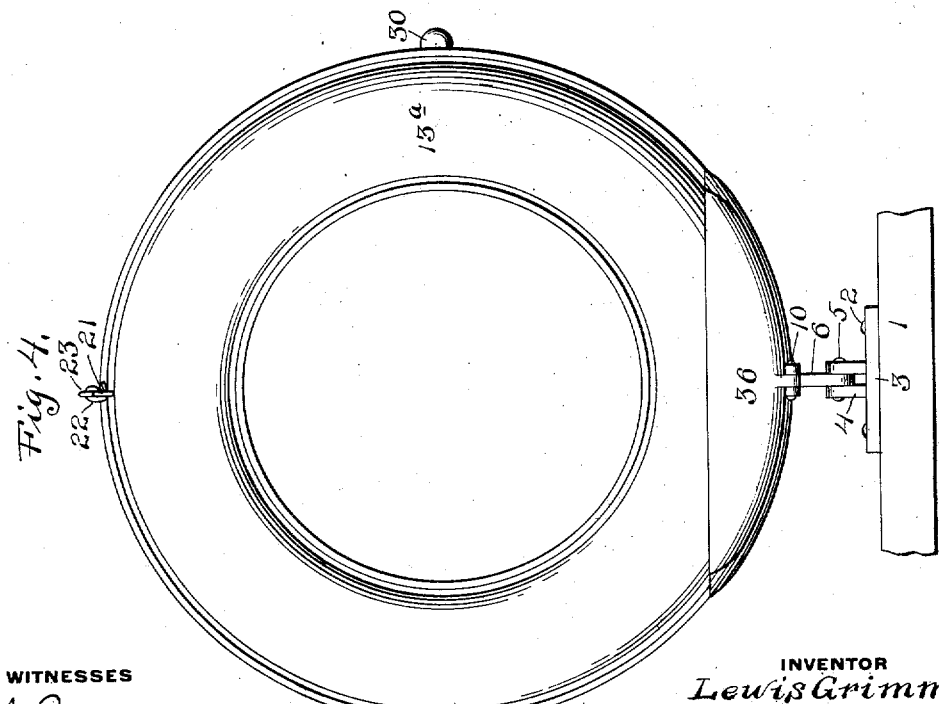

LEWIS GRIMM, OF PITTSBURGH, PENNSYLVANIA.

TIRE-CASE FOR AUTOMOBILES.

1,018,185.   Specification of Letters Patent.   Patented Feb. 20, 1912.

Application filed October 12, 1910. Serial No. 586,734.

*To all whom it may concern:*

Be it known that I, LEWIS GRIMM, citizen of the United States of America, residing at Pittsburgh, in the county of Allegheny and State of Pennsylvania, have invented certain new and useful Improvements in Tire-Cases for Automobiles, of which the following is a specification, reference being had therein to the accompanying drawing.

This invention relates to a tire case for automobiles and other vehicles, and the primary object of the invention is to provide positive and reliable means in a manner as will be hereinafter set forth for holding and protecting tires upon the running boards or other parts of automobiles from flying stones, the forces of nature and such injury as the tires would receive by not being thoroughly covered and protected.

Another object of the invention is to provide a tire case for compactly and snugly holding one or more tires, the case being constructed whereby easy access can be had to the interior of the same for placing and removing the tires.

A further object of the invention is to furnish a tire case with novel means for yieldably and adjustably holding the same, particularly upon the running board of an automobile.

With the above and such other objects in view as may hereinafter appear, the invention consists of the novel construction, combination and arrangement of parts to be hereinafter specifically described and then claimed.

Reference will now be had to the drawings forming part of this specification, wherein there are illustrated the preferred embodiments of the invention, but it is to be understood that the structural elements thereof are susceptible to such changes as fall within the scope of the appended claims.

In the drawings:—Figure 1 is a side elevation of the preferred form of tire case, with one of the supporting shoes thereof removed, Fig. 2 is an end elevation of the same, Fig. 3 is a vertical sectional view of the tire case, Fig. 4 is a side elevation of a modified form of tire case, Fig. 5 is an end elevation of the same, and Fig. 6 is a vertical sectional view of the modified form of tire case.

Like reference numerals designate corresponding parts throughout the several views.

1 denotes a running board or other support of an automobile, and secured to said running board by screws or other fastening means 2 is a plate 3 having two oppositely disposed apertured lugs 4 constituting a bearing for the tire case. Pivotally mounted between the apertured lugs 4 by a pin 5 is a depending apertured lug 6, carried by the off-set flange 7 of a segment-shaped shoe 8. The off-set flange 7 intermediate the ends thereof is provided with an apertured lug 9 and pivotally connected to said lug by a pin 10 is a segment-shaped shoe 11, the shoe being recessed, as at 12 to provide clearance for the lug 9.

13 denotes an annular casing semi-cylindrical in cross section and having the outer side thereof riveted or otherwise connected, as at 14 to the shoe 8. The inner annular edge of the casing 13 is off-set to provide an annular seat 15, and the outer annular edge of said casing is off-set to provide an annular seat 16.

17 denotes an annular casing, semi-cylindrical in cross section and adapted to confront the casing 13, said casing having the lower outer side thereof riveted or otherwise connected, as at 18 to the shoe 11. The inner annular edge of the casing 17 is off-set to provide an annular flange 19 adapted to engage in the seat 15, and the outer edge of said casing is off-set to provide another annular flange 20 adapted to engage in the seat 16.

21 denotes an eye carried by the top of the casing 17 adjacent to the flange 20, and this eye is adapted to be connected by a split link 22 to an eye 23 carried by the off-set annular outer edge of the casing 13. In addition to the link 22 employed for holding the casings together, the outer annular edge of the casing can be provided with a conventional form of lock 24 to lock the flange 20 in the seat 16. In lieu of the eye 21, link 22, and eye 23, a clasp or other fastening means can be employed.

25 denotes straps secured to the inner sides of the casings 13 and 17, said straps having buckles or other fastening means 26, whereby they can be connected to retain the tires 27 and 28 in the casings 13 and 17 respectively.

To retain the tire case in a vertical position upon the running board 1, the sides of the case are provided with eyes 29 connected by universal couplings 30 and telescopic rods 31 to eyes 32 carried by the sides of the automobile, the telescopic rods 31 allowing the case to be supported at an inclination relatively to the running board should the body of the car protrude above the running board, also to provide clearance for the side operating levers or any other parts of the automobile body.

In Figs. 4 to 6 inclusive, the shoe 8ª is of a greater width than the shoe 8 of the preferred form of construction in order to accommodate a single casing 13ª that is oblong in cross section, the casing having the inner and outer edges thereof flanged, as at 33 to receive the flanged edges 34 of an annular lid or cover 35, carried by a shoe 36 connected to the shoe 8ª, similar to the connection between the shoes 8 and 11. The single casing 13ª accommodates one or more tires and the outermost tire is retained in the casing by straps 37 similar to the straps 25.

From the foregoing it will be observed that the tire case protects the contents thereof from the forces of nature, theft, dirt, grease, and wear; that it can be made part of the car, painted, enameled, or finished to harmonize with the car; that it presents a better appearance than the present type of cover which generally is made of leather, gets dirty, wears shabby, and in a short time commences to leak, appears bad and is disagreeable to handle; and that my improved tire case can be made of various kinds of material coated or otherwise treated to render the same non-corrosive and capable of withstanding considerable wear and tear.

What I claim is:—

1. A tire case comprising a receptacle in the form of an annulus, including a stationary and a hinged section, one of said sections seated in and overlapped by the other section when the receptacle is closed, means for maintaining the sections closed, a segment-shaped shoe secured to the lower portion of the stationary section and having its inner portion off-set, a segment-shaped shoe fixed to the lower portion of the hinged section and pivotally connected to the off-set portion of the other shoe, and means for connecting that shoe provided with the off-set portion to a support.

2. A tire case comprising a receptacle in the form of an annulus, including a stationary and a hinged section, the open side of one section opposing the open side of the other section, the marginal portions throughout of the side walls at the open side of one section seated in and overlapped by the marginal portions throughout of the side walls of the open side of the other section, means for maintaining the sections closed, a segment-shaped shoe fixed to the lower portion of the stationary section and having its inner part off-set and formed with a lug, said off-set portion providing a clearance when said sections are closed, a segment-shaped shoe fixed to the lower portion of the hinged section and pivotally connected to said lug, and means for connecting the off-set shoe to a support.

In testimony whereof I affix my signature in the presence of two witnesses.

LEWIS GRIMM.

Witnesses:
 Max H. Srolovitz,
 K. H. Butler.